(12) United States Patent
Narasimhan et al.

(10) Patent No.: US 6,641,322 B2
(45) Date of Patent: Nov. 4, 2003

(54) COUPLING WITH TRIBOLOGICAL COATING SYSTEM

(75) Inventors: Dave Narasimhan, Flemington, NJ (US); Thirumalai Palanisamy, Morristown, NJ (US); Rodney Iverson, Oro Valley, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/326,175

(22) Filed: Dec. 20, 2002

(65) Prior Publication Data

US 2003/0099509 A1 May 29, 2003

Related U.S. Application Data

(62) Division of application No. 09/660,647, filed on Sep. 13, 2000, now Pat. No. 6,520,703.

(51) Int. Cl.$^7$ .............................. F16D 1/00; F16G 11/00
(52) U.S. Cl. .......................... 403/29; 403/30; 403/204; 403/359.1; 403/404
(58) Field of Search ............................ 403/359.1, 404, 403/410, DIG. 1, DIG. 2, 24, 28, 29, 30, 204, 270, 271, 272, 265

(56) References Cited

U.S. PATENT DOCUMENTS

| | | |
|---|---|---|
| 1,753,773 A | 4/1930 | Champion |
| 2,200,129 A | 5/1940 | Whiteford |
| 2,676,279 A | 4/1954 | Wilson |
| 2,763,141 A | 9/1956 | Dodge |
| 2,855,769 A | 10/1958 | Garnier |
| 3,329,452 A | 7/1967 | Ammon |
| 3,712,338 A * | 1/1973 | Bucalo .................. 137/625.41 |
| 3,922,044 A * | 11/1975 | Bucalo ........................ 308/237 |
| 4,009,027 A * | 2/1977 | Naidich et al. ................ 75/154 |
| 4,491,082 A * | 1/1985 | Barch et al. ................. 118/234 |
| 4,747,722 A | 5/1988 | Kawaguchi et al. |
| 4,781,799 A * | 11/1988 | Herbert, Jr. et al. ............. 204/9 |
| 5,013,948 A * | 5/1991 | Tumpey et al. ........... 310/68 D |
| 5,087,146 A | 2/1992 | Motzet et al. |
| 5,108,025 A * | 4/1992 | Kang et al. .................. 228/122 |
| 5,514,926 A | 5/1996 | Bushman |
| 5,523,635 A * | 6/1996 | Ferreira et al. ................ 310/71 |
| 5,524,342 A * | 6/1996 | Swain et al. ........... 29/895.212 |
| 5,660,482 A | 8/1997 | Newley et al. |
| 5,856,645 A * | 1/1999 | Norton ..................... 200/61.53 |
| 5,861,692 A * | 1/1999 | Furlani et al. ............... 310/103 |
| 5,912,916 A * | 6/1999 | Hendrix ........................ 373/94 |
| 6,124,767 A * | 9/2000 | Woods .................... 331/117 D |
| 6,141,856 A * | 11/2000 | Johnson et al. ................ 29/598 |
| 6,296,084 B1 * | 10/2001 | Trustee ...................... 188/71.5 |
| 6,324,821 B1 * | 12/2001 | Bauer et al. ..................... 54/9 |
| 6,362,708 B1 * | 3/2002 | Woods ........................ 333/234 |
| 6,378,874 B1 * | 4/2002 | Dorulla ...................... 277/410 |
| 6,447,970 B1 * | 9/2002 | Matsunaga et al. ....... 430/108.3 |
| 6,494,824 B1 * | 12/2002 | Apple et al. .................... 600/3 |

OTHER PUBLICATIONS

H. Kong and M. F. Ashby; Wear Mechanisms In Brittle Solids; Pergamon Journals Ltd; Mar. 4, 1992; Great Britain.

S.C. Lim and M. F. Ashby; Overview No. 55, Wear–Mechanism Maps; Pergamon Journals Ltd; Mar. 10, 1986; Great Britain.

* cited by examiner

*Primary Examiner*—Christopher J. Novosad
(74) *Attorney, Agent, or Firm*—Robert Desmond, Esq.

(57) ABSTRACT

A coupling with a tribological system that can withstand temperatures up to 600° C. The coupling includes a shaft having an outer surface with a layer of chromium and a sleeve for receiving the shaft. The sleeve has an inner surface with a layer of silver or gold. The silver or gold layer contacts the chromium layer to form the tribological system.

6 Claims, 2 Drawing Sheets

COUPLING WITH TRIBOLOGICAL COATING SYSTEM

RELATED APPLICATIONS

This is a divisional of and claims priority from application Ser. No. 09/660,647, now U.S. Pat. No. 6,520,703, entitled "Coupling With Tribological Coating System", filed Sep. 13, 2000, which is incorporated herein by reference.

TECHNICAL FIELD

This invention relates to couplings for rotating components such as an electric generator shaft and a gearbox and in particular to a tribological coating system for use on such couplings.

BACKGROUND OF THE INVENTION

FIGS. 1A and 1B show typical components of a coupling assembly for coupling an electric generator shaft to a gearbox. The assembly includes a sleeve 10 having an axially extending portion 12 and a flange portion 14. The axially extending portion 12 has a generally square cross-section with the four corners beveled. The axially extending portion 12 is inserted into a hollow section of an electric generator shaft having the same cross-sectional shape. Also part of the assembly is a drive shaft 20. The drive shaft 20 has a splined portion 22 for engaging corresponding splines in a gearbox. It also has an axially extending shaft portion 24 shaped and sized to be inserted into the sleeve 10.

During prolonged usage at high speeds and temperatures, this prior art coupling assembly will experience wear on the contacting surfaces. This wearing may result in the binding of the shaft portion 24 and/or the tearing of the sleeve 10.

Accordingly, there exists a need for a coupling assembly having a tribological system that can operate at high temperatures and speed.

SUMMARY OF THE INVENTION

An object of the present invention is to provide a coupling assembly having a tribological system that can operate at high temperatures and speed.

The present invention achieves this object by providing a coupling with a tribological system that can withstand temperatures up to 600° C. The coupling includes a shaft having an outer surface with a layer of chromium and a sleeve for receiving the shaft. The sleeve has an inner surface coated with a layer of silver or gold. The silver or gold layer contacts the chromium layer to form the tribological system.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 2:
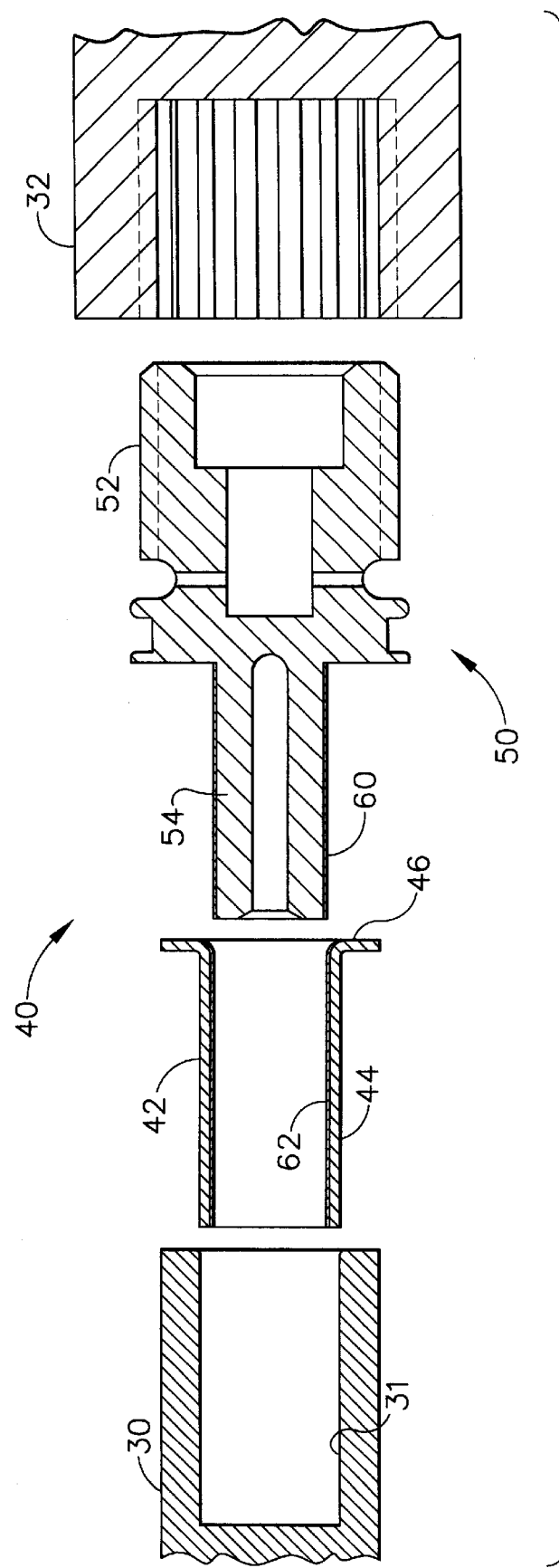
FIG. 2 is an exploded, cross-sectional view of the coupling assembly contemplated by the present invention.

Referring to FIG. 2 a coupling assembly for coupling an electric generator shaft 30 to a gearbox 32 is generally denoted by reference number 40. The assembly 40 includes a sleeve 42 having an axially extending portion 44 and a flange portion 46. The axially extending portion 44 has a generally square cross-section with the four corners beveled. The sleeve 42 is preferably formed of aluminum bronze. Alternatively, the sleeve 42 can be formed of brass (Cu—Zn) alloy, tin bronze (Cu—Sn) alloys or other copper beryllium alloys. The axially extending portion 44 is inserted into a hollow section 31 of the electric generator shaft 30. the hollow section 31 having the same cross-sectional shape as the shaft portion 44. The assembly also includes a drive shaft 50. The drive shaft 50 has a splined portion 52 for engaging corresponding splines in the gearbox 32. It also has an axially extending shaft portion 54 shaped and sized to be inserted into the axially extending portion 44 of the sleeve 42. The drive shaft 50 is preferably formed of a steel alloy.

Disposed between the axially extending portion sleeve 44 and the axially extending shaft portion 54 is a tribological system that can withstand prolonged high speed and high temperature operation. The tribological system is comprised of a chromium layer 60 on the outer surface of the axially extending shaft portion 54 and a silver layer 62 on the inner surface of the axially extending sleeve portion 44. Alternatively, the layer 62 can be gold. The layer of gold or silver is preferably pure meaning that impurities are at most 1% of the composition. The silver, gold and chromium are preferably applied to their respective surfaces by plating processes familiar to those skilled in the art. The silver or gold plating is metallurgically bonded to the sleeve portion 44 by heat treating at 600° C. for ½ hour. Alternatively, the layers may be applied by other techniques such as evaporation or physical vapor deposition. In the preferred embodiment, the thickness of the chromium layer 60 is in the range of 0.0005 to 0.002 inch with 0.001 inch being the preferred thickness. Likewise, the thickness of the silver or gold layer 62 is in the range of 0.0005 to 0.002 inch with 0.001 inch being the preferred thickness.

Figure 1A:
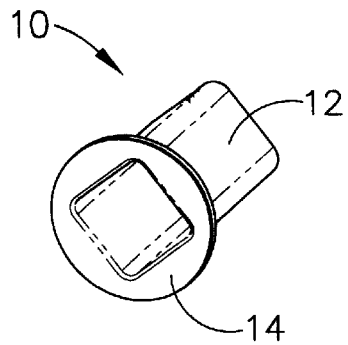
FIG. 1A is a perspective view of a prior art sleeve.
Figure 1B:
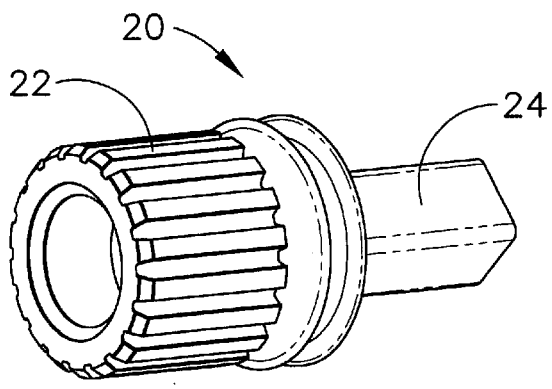
FIG. 1B is a perspective view of a prior art drive shaft.
Figure 3:
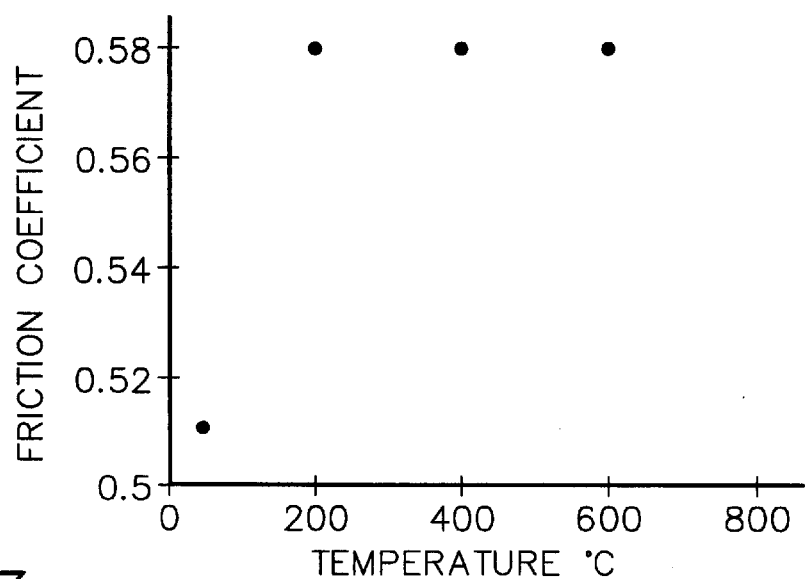
FIG. 3 is a plot of test data from the testing of a coupling assembly contemplated by the present invention.

FIG. 3 is a plot of test data taken from the testing of the coupling assembly contemplated by the present invention. The X-axis shows temperature and the Y-axis coefficient of friction. The data shows that within experimental error the coefficient stayed unchanged even at temperatures up to 600° C.

Thus a coupling assembly is provided that can operate at temperatures as high as 600° C. without galling, loss of surface finish or significant wearing of either the sleeve or the drive shaft.

Though the invention has been described with respect to the square shaped components used in coupling a generator to a gearbox, it should be appreciated that the invention is applicable to the coupling of other components independent of cross-sectional shape. Thus, this description of the preferred embodiment should be considered exemplary and not as limiting the scope and spirit of the invention as set forth in the following claims.

What is claimed is:

1. A coupling assembly comprising:

a shaft having an outer surface with a layer of chromium; and a sleeve for receiving said shaft and having an inner surface with a layer of gold metallurgically bonded thereto, said gold layer contacting said chromium layer to form a tribological system.

2. The coupling assembly of claim 1 wherein said sleeve is of a material selected from a group consisting of aluminum bronze, brass, tin bronze and copper beryllium.

3. The coupling assembly of claim 2 wherein said shaft is made of a steel alloy.

4. The coupling assembly of claim 1 wherein said sleeve is of aluminum bronze.

5. The coupling assembly of claim 1 wherein the thickness of the chromium layer is in the range of 0.0005 to 0.002 inch.

6. The coupling assembly of claim 1 wherein the thickness of the gold layer is in the range of 0.0005 to 0.002 inch.

* * * * *